UNITED STATES PATENT OFFICE.

PATRICK J. RYAN, OF NEW YORK, N. Y., ASSIGNOR TO CHADELOID CHEMICAL COMPANY, OF NEW YORK, N. Y., A CORPORATION OF WEST VIRGINIA.

FINISH-REMOVER.

No. 878,240.

Specification of Letters Patent.

Patented Feb. 4, 1908.

Application filed June 22, 1907. Serial No. 380,194.

*To all whom it may concern:*

Be it known that I, PATRICK J. RYAN, a citizen of the United States, and resident of the city, county, and State of New York, have made certain new and useful Inventions Relating to Finish-Removers, of which the following is a specification.

This invention relates to finish removers and relates especially to compositions for removing paint, varnish and other finishes from surfaces.

The remover may comprise volatile solvent material of any desired character, such for example, as benzole or its homologues, combined with alcoholic or ketonic material, such for example, as wood alcohol or acetone. To the solvent material suitable stiffening and evaporation retarding material may be added and incorporated, such as bone dust, burned bone in a powdered condition, wood or potato flour or fecula, a special potato product recently developed and sold under that name.

A suitable illustrative composition suitable for general purposes may comprise benzole, one part, and acetone or wood or grain alcohol two parts, with which about one-half to a pound and a half of bone dust per gallon has been thoroughly incorporated. A similar illustrative composition may comprise benzole one part, acetone two parts with which from two ounces to a pound and a half of fecula per gallon has been thoroughly incorporated. Another illustrative composition may comprise benzol 1 part, acetone 2 parts, with which 1¼ to 1½ pounds of bone dust, pulverized burned bones, and of potato flour or fecula has been incorporated to increase the consistency of the remover and retard its evaporation.

This invention has been described in connection with a number of illustrative ingredients, formulas, proportions and processes, to the details of which disclosure the invention is not, of course, to be limited.

What is claimed is:

1. The finish remover comprising approximately benzol 1 part, acetone 2 parts, with which from 1¼ to 1½ pounds per gallon of bone dust, pulverized burned bones and of fecula has been incorporated to increase the consistency of the remover and retard its evaporation.

2. The finish remover comprising approximately 1 part of benzol, 2 parts of acetone, with which a substantial proportion of stiffening and evaporation retarding material including bone dust has been added.

3. The finish remover comprising volatile solvent material including benzol, with which a substantial proportion of stiffening and evaporation retarding material including fecula and bone dust has been incorporated.

4. The remover comprising volatile solvent material with which a substantial proportion of stiffening and evaporation retarding material including bone dust has been incorporated.

5. The remover comprising volatile solvent material with which a substantial proportion of bone dust, pulverized burned bones and of fecula has been incorporated to increase the consistency of the remover and retard the evaporation thereof.

PATRICK J. RYAN.

Witnesses:
HARRY L. DUNCAN,
JESSIE B. KAY.